United States Patent
Allen et al.

(10) Patent No.: US 10,296,576 B2
(45) Date of Patent: May 21, 2019

(54) FILLING INFORMATION FROM MOBILE DEVICES WITH SECURITY CONSTRAINTS

(71) Applicant: International Business Machines Corporation, Armonk, NY (US)

(72) Inventors: Corvillle O. Allen, Morrisville, NC (US); Madison E. Cantrell, Raleigh, NC (US); Michael C. Gouveia, Raleigh, NC (US); Anandakrishnan Narayanan, Morrisville, NC (US); Roman Ruiz-Esparza, Cary, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 336 days.

(21) Appl. No.: 14/962,094

(22) Filed: Dec. 8, 2015

(65) Prior Publication Data

US 2017/0161247 A1  Jun. 8, 2017

(51) Int. Cl.
G06F 17/22 (2006.01)
G06F 17/24 (2006.01)

(52) U.S. Cl.
CPC .................... *G06F 17/243* (2013.01)

(58) Field of Classification Search
CPC ....................................................... G06F 17/20
See application file for complete search history.

(56) References Cited

U.S. PATENT DOCUMENTS

| | | | |
|---|---|---|---|
| 7,660,779 B2 | 2/2010 | Goodman et al. | |
| 2002/0049686 A1 | 4/2002 | Chuang et al. | |
| 2004/0122774 A1* | 6/2004 | Studd et al. | G06F 17/60 |
| 2006/0059434 A1 | 3/2006 | Boss et al. | |
| 2011/0071994 A1 | 3/2011 | Tabrizi | |
| 2012/0059842 A1 | 3/2012 | Hille-Doering et al. | |
| 2012/0061124 A1* | 3/2012 | Cui | B82Y 20/00 174/128.1 |
| 2012/0137369 A1* | 5/2012 | Shin | G06F 21/57 726/25 |
| 2012/0173222 A1* | 7/2012 | Wang | G06F 17/273 704/2 |
| 2012/0203733 A1 | 8/2012 | Zhang | |

(Continued)

FOREIGN PATENT DOCUMENTS

WO   2014070950 A1   5/2014

OTHER PUBLICATIONS

E. Rukzio et al.,"Privacy-enhanced Intelligent Automatic Form Filling for Context-aware Services on Mobile Devices", Journal Pervasive and Mobile Computing, vol. 4, Issue 2, Apr. 2008, p. 1-8.

(Continued)

*Primary Examiner* — James J Debrow
(74) *Attorney, Agent, or Firm* — Cantor Colburn LLP; Michael O'Keefe

(57) ABSTRACT

A system for a mobile device includes at least one processor operatively connected to a computer readable storage medium in the at least one processor is programmed to receive a request for personal data. The request contains a plurality of input fields. The at least one processor identifies a list of applications to provide personal data based on the plurality of input fields and a user-defined security constraint. The at least one processor outputs for display the list of applications.

11 Claims, 2 Drawing Sheets

(56) References Cited

U.S. PATENT DOCUMENTS

| | | | |
|---|---|---|---|
| 2015/0040229 A1* | 2/2015 | Chan | G06F 21/577 |
| | | | 726/25 |
| 2015/0271164 A1 | 9/2015 | Hamid | |
| 2016/0162172 A1* | 6/2016 | Rathod | G06F 3/0481 |
| | | | 715/747 |

OTHER PUBLICATIONS

Allen, Corville O. et al., "Filling Information From Mobile Devices With Security Constraints"; U.S. Appl. No. 16/114,269, filed Aug. 28, 2018.

IBM "List of IBM Patents or Patent Applications Treated As Related"; Date Filed: Aug. 28, 2018, 2 pages.

* cited by examiner

FILLING INFORMATION FROM MOBILE DEVICES WITH SECURITY CONSTRAINTS

BACKGROUND

The present invention generally relates to a computer implemented method, a computer program product, and a method of filling forms on a mobile device with security constraints.

Users of a mobile device are generally required to manually and repeatedly enter personal information into web-based forms received by the mobile device. There presently is no uniform and efficient way to capture and share personal information between end users and service providers through the web-based forms.

SUMMARY

In one embodiment of the present invention, a computer implemented method for filling forms a mobile device is provided. The computer implemented method includes receiving a form having a plurality of input fields and identifying a list of applications available to a mobile device to provide personal data based on the plurality of input fields and a user-defined security constraints. The computer implemented method further includes displaying the list of applications to a user.

In another embodiment of the present invention, a computer program product for filling forms a mobile device is provided. The computer program product includes a computer readable storage medium having program instructions executable by at least one processor that receives a request for personal data via a web-based form having a plurality of input fields. The at least one processor groups the plurality of input fields through a list of applications capable of at least partially satisfying their quest for personal data based on a user-defined security constraints. The at least one processor outputs for display the list of applications to a user.

Yet, in another embodiment, a system for a mobile device is provided. The system includes at least one processor operatively connected to a computer readable storage medium in the at least one processor is programmed to receive a request for personal data. The request contains a plurality of input fields. The at least one processor identifies a list of applications to provide personal data based on the plurality of input fields and a user-defined security constraint. The at least one processor outputs for display the list of applications.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
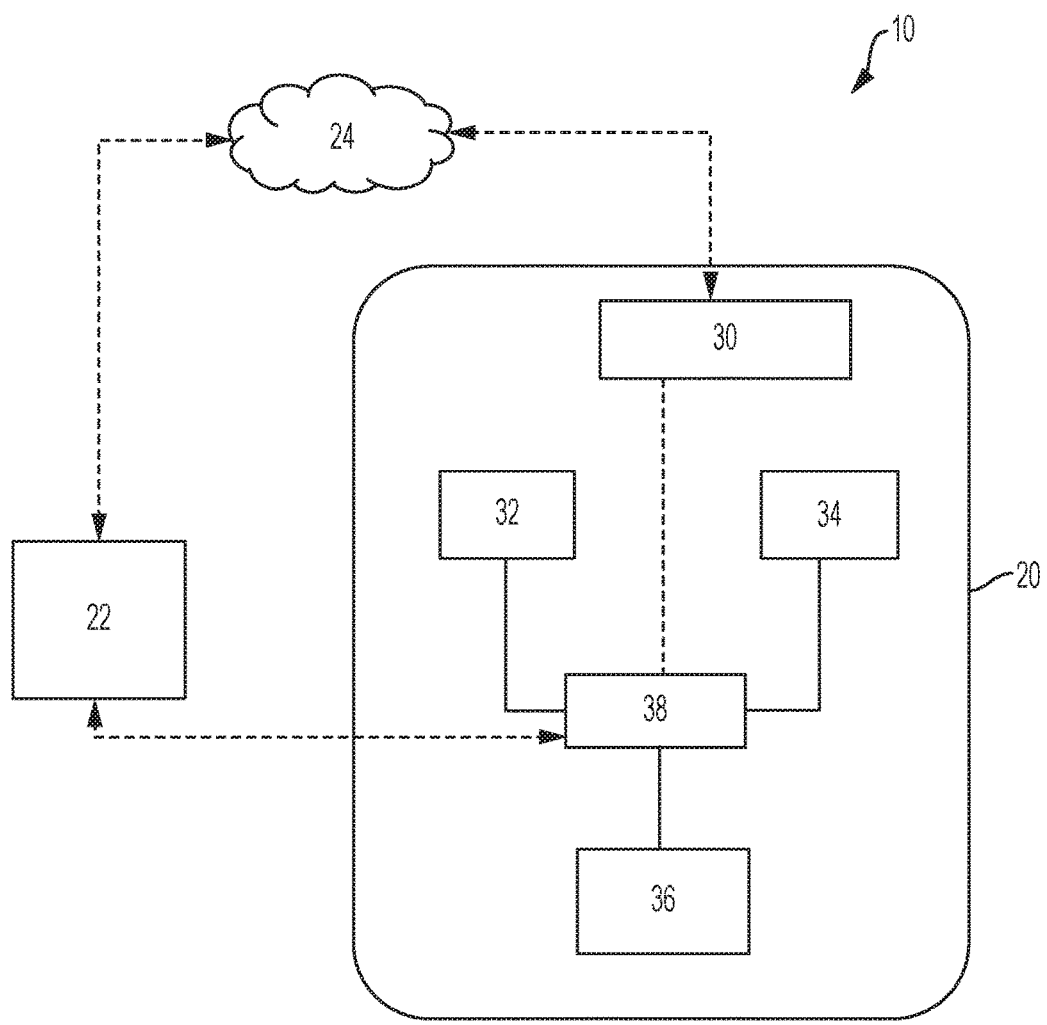
FIG. 1 is an illustrative view of a mobile device according to an embodiment of the present invention.

As stated above, the present invention relates to a computer implemented method, a computer program product, and a method of filling forms on a mobile device with security constraints, which are now described in detail with accompanying figures. It is noted that like reference numerals refer to like elements across different embodiments.

Referring to FIG. 1 a block diagram of a system 10 for filling forms on a mobile device is shown. The system 10 includes a mobile device 20 in communication with a third-party requester 22. The mobile device 20 may be a cell phone, smart phone, PDA, or any other device having wireless remote network connectivity. The mobile device 20 may be directly in communication with the third-party requester 22 or in communication with the requester via a network 24. The network 24 includes communication channels for exchanging data such as the Internet, and extranet, and intranet, a local area network, a wide area network, near field communications, satellite or wireless communications, or the like.

The mobile device 20 includes a communication device 30, an input device 32, a display interface 34, and a computer readable storage medium 36 all of which are in communication with at least one processor 38. In at least one embodiment, the communication device 30 is a transceiver that places the mobile device 20 in communication with data sources or data requesters directly or through the network 24.

The input device 32 is a mechanism that permits a user of the mobile device 20 to input information into the mobile device 20. The input device 32 is a human machine interface. The input device 32 is a keyboard, a mouse, a pointer, a microphone, a voice recognition device, a biometric device, or the like.

The display interface 34 is a mechanism that enables the mobile device 20 to output for display information to a user of the mobile device 20. The display interface 34 includes a screen, a speaker or other auditory output device, a haptic device, a touchscreen, a visual display.

The at least one processor 38 is in communication with or connected to the computer readable storage medium 36. The computer readable storage medium 36 includes at least one of a non-persistent storage and a persistent storage. In at least one embodiment, the non-persistent storages random-access memory and the persistent storage is a hard disk drive or flash memory. The computer readable storage medium 36 embodies a computer program product for filling forms on the mobile device 20. The computer program product embodies executable program instructions that are executable by the at least one processor 38 to perform the operations of the executable program instructions.

The at least one processor 38 receives a request for personal data from the third-party requester 22. The request for personal data is provided by the third-party requester 22 through a web-based form, a QR code, a submit-able form, or the like. The request for personal data is provided as part of a form that includes at least a plurality of input fields. The plurality of input fields includes a text field, a file input field, a checkbox, a radio button, a select box, or the like.

The web-based form is in a generic format such as XML, HTML, or the like. The at least one processor 38 determines the appropriate personal data that is to be entered into at least one of the plurality of input fields. The format or coding of the plurality of input fields reveals the type of input field, the data that may be entered into the input field, and other identifiers of the input field such as an input field feature.

In at least one embodiment, the at least one processor 38 is programmed to recognize text around an input field to determine the type of input requested for the input field. For example, the input field is a text field that requests the user's name, either first name or last name.

Types of input fields that request personal data may include, for example, first name, last name, middle name, home address, company name, company title, city, state, zip, phone number, email address, social security number, security questions, options, opinions, personally identifiable information, gaming identification (such as Xbox live identification), usernames, passwords, or the like.

The at least one processor 38 is programmed to search for or access applications available to the mobile device 20 that contain personal data. The applications are stored on the mobile device 20, more specifically on the computer readable storage medium 36. In at least one embodiment, the applications are available to or accessible by the mobile device 20 and may or may not be stored on the mobile device 20.

The user of the mobile device 20 is able to specify varying levels of security constraints on the use of personal data from the applications. These user-defined security constraints limit what personal data of the user are capable of being provided to a third-party requester 22. For example, as a user of the mobile device 20 enters information into the application, the user specifies if the application may share data with a third-party requester 22. Should the user permit an application to share data with a third-party requester 22, the user may specifically identify what items of personal data may be shared with the third-party requester 22. In some instances, the user may request that certain identifiable personal data be shared with a third-party requester 22 subject to further approvals or actions by the user such that additional identifiable personal data is able to be shared with the third-party requester 22.

Figure 2:
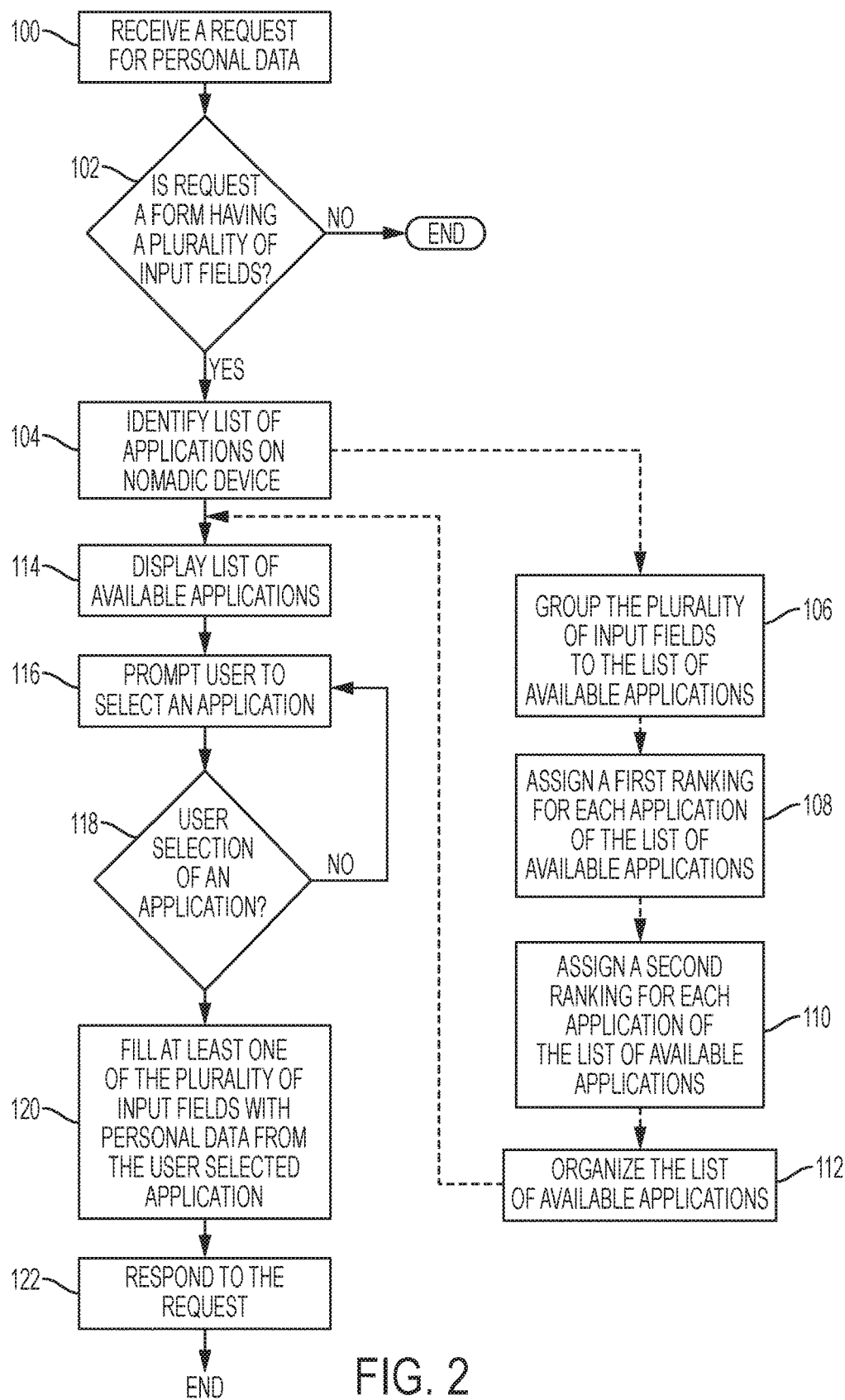
FIG. 2 a flowchart for filling forms on a mobile device according to an embodiment of the present invention.

Referring to FIG. 2, a flowchart for filling forms on a mobile device according to an embodiment of the present invention. The flowchart demonstrates an exemplary system response to the receipt of a request for personal data by a third-party requester 22. The at least one processor 38 is programmed to perform the steps outlined below.

At block 100, the mobile device 20 receives a request for personal data from a third-party requester 22. The request for personal data is provided by the third-party requester 22 via a web-based form that contains a plurality of input fields. The at least one processor 38 is programmed to identify the plurality of input fields and or identify a value of each of the plurality of input fields.

At block 102, the at least one processor 38 determines if the request for personal data is a web-based form having a plurality of input fields. If the web-based form does not have a plurality of input fields, the at least one processor 38 may end the method. Should the web-based form have a plurality of input fields, the at least one processor 38 continues to block 104.

At block 104, the at least one processor 38 identifies a list of applications available to or accessible by the mobile device 20 that are capable of providing personal data to satisfy the request for personal data. The list of applications available to or accessible by the mobile device 20 are identified by the at least one processor 38 based on the plurality of input fields and the user-defined security constraints. The at least one processor 38 performs a subroutine or an identification method beginning at block 106 to identify the list of applications available to are accessible by the mobile device 20 to provide the personal data.

At block 106, the at least one processor 38 groups the plurality of input fields to a list of potential applications available to or accessible by the mobile device 20 that are capable of providing personal data to at least partially satisfy the request for personal data. The grouping of the plurality of input fields attempts to sort and compare the plurality of input fields to the personal data available on or within the applications available to or accessible by the mobile device 20.

At block 108, the at least one processor 38 assigns a first ranking for each application of the list of applications available to or accessible by the mobile device 20. The first ranking is based on a number of input fields of the plurality of input fields that are associated with the personal data of each application of the list of applications available to or accessible by the mobile device 20. For example, should at least one field of the plurality fields be requesting a user of the mobile device's last name, the at least one processor 38 provides a count or similar valuation of the number of applications available to or accessible by the mobile device 20 that include the last name. Based on the valuation of the number of fields that may be satisfied by each application of the list of applications available to or accessible by the mobile device 20, a first ranking is provided.

At block 110, the at least one processor 38 assigns a second ranking for each application of the list of applications available to or accessible by the mobile device 20. The second ranking is based on a number of input fields that are associated with the personal data restricted from access by the third-party requester 22 by the user-defined security constraints. For example, should at least one field of the plurality of fields be requesting a user of the mobile devices middle name and the user of the mobile device 20 has restricted a specific application from providing the user's middle name, the at least one processor provides a count or similar valuation of the number of applications available to or accessible by the mobile device 20 that have such a restriction or does not have such a restriction. Based on the valuation of the number of fields that are restricted by the user-defined security constraints, the second ranking is provided.

At block 112, the at least one processor 38 organizes the list of applications available to or accessible by the mobile device 20. The list of applications available to or accessible by the mobile device 20 is organized based on at least one of the first ranking and the second ranking. In at least one embodiment, the second ranking is provided greater weight than the first ranking such that the user-defined security constraints receive priority. As such, the identified list of applications available to or accessible by the mobile device 20 are listed or ranked in order that provides the most information to satisfy the user defined security constraint and the request for personal data.

Returning back to the main routine, at block 114, the at least one processor 38 outputs for display the list of applications available to or accessible by the mobile device 20. The list of applications available to or accessible by the mobile device 20 is displayed to the user of the mobile device 20 via the display interface 34.

At block 116, the at least one processor 38 outputs for display a first prompt to the user of the mobile device 20 select an application of the list of applications available to or accessible by the mobile device 20 to provide personal data to at least partially satisfy the request for personal data. The first prompt is output for display via the display interface 34. A user of the mobile device 20 is prompted to provide an input via the input device 32 to select an application.

A block 118, the at least one processor 38 determines if a user of the mobile device 20 selects an application of the list of applications available to or accessible by the mobile device 20. Should a user of the mobile device 20 not have selected an application, the at least one processor 38 may return to block 116 and further prompt the user to select an application or cancel the operation. If a user of the mobile device 20 selects an application of the applications available to or accessible by the mobile device 20 the at least one processor 38 continues to block 120. In at least one embodiment, the at least one processor 38 further prompt the user of the mobile device 20 to confirm the users desire to provide personal data to the third-party requester 22. Should the user of the mobile device 20 decide to continue to provide personal data to third-party requester 22, the at least one processor 38 proceeds to fill out the web-based form at block 120.

At block 120, in response to a user selection of the application of the applications available to accessible by the mobile device 20, the at least one processor 38 fills in at least one of the plurality of input fields with personal data from the user selected application. The personal data provided to fill in at least one of the plurality of input fields is subject to the user-defined security constraints. The user-defined security constraint inhibits the filling of at least one of the plurality input fields that contains an input field subject to the user-defined security constraint with personal data. In response to the user-defined security constraint inhibiting the filling of at least one of the plurality of input fields, the at least one processor 38 outputs for display a second prompt to the user of the mobile device 20.

The second prompt is output for display via the display interface 34. A user of the mobile device 20 is prompted to provide personal data into the at least one of the plurality of input fields inhibited from being filled by the user-defined security constraint. The user of the mobile device 20 is able to provide the personal data via the input device 32 into at least one of the plurality of input fields inhibited from receiving data from the user selected application. In at least one embodiment, the second prompt to the user of the mobile device 20 prompts the user to select a subsequent application of the applications available to or accessible by the mobile device 20 to provide the personal data to further satisfy the request for personal data by the third-party requester 22.

At block 122, the at least one processor 38 responds to the request for personal data by the third-party requester 22. In responding to the request for personal data by the third-party requester 22, the at least one processor 38 stores the web-based form on the computer readable storage medium 36 with the at least partially filled in personal data provided by the application(s) of the applications available to or accessible by the mobile device 20. The at least one processor 38 responds to the request for personal data by the third-party requester 22 by outputting for display the completed or at least partially completed web-based form to the user of the mobile device 20 via the display interface 34. The user the mobile device 20 is able to verify the information and subsequently submit the web-based form to the third-party requester 22. In at least one embodiment, the user of the mobile device 20 is prompted to print or store the web-based form prior to or after submission of the web-based form to the third-party requester 22.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e. occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for filling forms on a mobile device, the method comprising:
   receiving a form having a plurality of input fields;
   identifying the plurality of input fields;
   identifying a list of applications available to a mobile device to provide personal data based on the plurality of input fields and a user-defined security constraint;
   displaying the list of applications to a user;
   prompting a user to select an application of the list of applications; and
   in response to a user selection of the application of the list of applications, filling at least one of the plurality of input fields with the personal data from an application of the list of applications subject to the user-defined security constraint,
   wherein identifying the list of applications assigning a first ranking for each application of the list of applications based on a number of input fields associated with the personal data capable of being provided by each application.

2. The computer implemented method of claim 1, wherein the user-defined security constraint inhibits filling of at least one of the plurality of input fields that contains an input field subject to the user-defined security constraint with personal data.

3. The computer implemented method of claim 1, wherein identifying the list of applications comprises assigning a second ranking for each application of the list of application based on a number of input fields of the plurality of input fields associated with the personal data restricted by the user-defined security constraint.

4. The computer implemented method of claim 3, wherein identifying the list of applications comprises organizing the list of applications based on at least one of the first ranking and the second ranking.

5. A computer program product for filling forms on a mobile device, the computer program product comprising a computer readable storage medium having program instructions embodied therewith, the program instructions executable by at least one processor to perform a method comprising:
receiving a request for personal data via a web-based form having a plurality of input fields;
grouping the plurality of input fields to a list of applications capable of at least partially satisfying the request for personal data based on a user-defined security constraint, wherein grouping the plurality of input fields comprises identifying the list of applications based on the plurality of input fields and the user-defined security constraint;
outputting for display the list of applications to a user;
outputting for display a first prompt to the user to select an application of the list of applications to provide personal data; and
in response to a user selection of the application, filling at least one of the plurality of input fields with the personal data from a user selected application based on the user-defined security constraint,
wherein identifying the list of applications comprises assigning a first ranking for each application of the list of applications based on a number of input fields associated with the personal data capable of being provided by each application.

6. The computer program product of claim 5, further comprising in response to the user-defined security constraint inhibiting the filling of at least one of the plurality of input fields, outputting for display a second prompt to the user to provide personal data into the at lest one of the plurality of input fields inhibited from being filled by the user-defined security constraint.

7. The computer program product of claim 5, further comprising storing the web-based form with the personal data on the computer readable storage medium.

8. The computer program product of claim 5, further comprising responding to the request for personal data.

9. A system for a mobile device, the system comprising:
at least one processor operatively connected to a computer readable storage medium, the at least one processor programmed to:
receive a request for personal data, the request containing a plurality of input fields;
identify a list of applications to provide the personal data based on the plurality of input fields and a user-defined security constraint;
output for display the list of applications;
prompt a user to selected an application of the list of applications to provide the personal data; and
in response to a user selection of the application to provide the personal data, filling at least one of the plurality of input fields with the personal data from a user selected application based on the user-defined security constraint,
wherein identifying the list of applications comprises assigning a first ranking for each application of the list of applications based on a number of input fields associated with the personal data capable of being provided by each application.

10. The system of claim 9, wherein the at least one processor is further programmed to group the plurality of input fields to the list of applications.

11. The system of claim 9, wherein the at least one processor is further programmed to respond to the request for personal data.

* * * * *